(12) United States Patent
Winter et al.

(10) Patent No.: US 11,293,815 B2
(45) Date of Patent: Apr. 5, 2022

(54) AIR TEMPERATURE CORRECTION

(71) Applicant: Rosemount Aerospace Inc., Burnsville, MN (US)

(72) Inventors: John D. Winter, Apple Valley, MN (US); Wesley J. Schwartz, Bloomington, MN (US); Darren G. Jackson, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 434 days.

(21) Appl. No.: 16/041,430

(22) Filed: Jul. 20, 2018

(65) Prior Publication Data

US 2020/0025632 A1    Jan. 23, 2020

(51) Int. Cl.
| | |
|---|---|
| *G01K 13/12* | (2006.01) |
| *G01K 13/02* | (2021.01) |
| *B64D 15/22* | (2006.01) |
| *G01P 5/165* | (2006.01) |
| *G01P 13/02* | (2006.01) |
| *G01K 13/024* | (2021.01) |

(52) U.S. Cl.
CPC .......... *G01K 13/028* (2013.01); *B64D 15/22* (2013.01); *G01P 5/165* (2013.01); *G01K 13/024* (2021.01); *G01P 13/025* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,763,858 | A | * | 6/1998 | Jones ..................... B64D 15/22 219/213 |
| 6,543,298 | B2 | | 4/2003 | Cronin et al. |
| 7,845,221 | B2 | | 12/2010 | Severson et al. |
| 8,392,141 | B2 | | 3/2013 | Wigen |
| 8,711,008 | B2 | * | 4/2014 | Cook ..................... G01K 13/02 340/962 |

(Continued)

FOREIGN PATENT DOCUMENTS

WO    2005020175    3/2005

OTHER PUBLICATIONS

D.N. Zhivoglotov: "Estimation of liquid water content effects on the air temperature measurements in the clouds based on the wind tunnel experiments", Russian Meteorology and Hydrology, vol. 38, No. 8, Aug. 1, 2013 (Aug. 1, 2013), pp. 531-538, XP055648929, Heidelberg.

(Continued)

*Primary Examiner* — Lisa M Caputo
*Assistant Examiner* — Nasir U. Ahmed
(74) *Attorney, Agent, or Firm* — Locke Lord LLP; Daniel J. Fiorello; Gabrielle Gelozin (57) ABSTRACT

A system for correcting an air temperature (AT) reading can include a water content sensor configured to measure a water content in an airflow and to output a water content signal indicative thereof, an AT sensor configured to measure an air temperature and output an AT signal indicative thereof, and a correction module operatively connected to the water content sensor and the AT sensor. The correction module can be configured to receive the water content signal and the AT signal and to correct the AT signal based on the water content to output a corrected AT signal.

18 Claims, 7 Drawing Sheets

(56) References Cited

U.S. PATENT DOCUMENTS

| | | | | |
|---|---|---|---|---|
| 9,689,755 B2* | 6/2017 | Gmach | ............... | G01K 13/028 |
| 2016/0161313 A1* | 6/2016 | Yamaguchi | ............... | G01F 1/69 |
| | | | | 73/114.34 |
| 2016/0180611 A1* | 6/2016 | Cadotte | .................... | G01P 5/16 |
| | | | | 701/30.6 |
| 2017/0190431 A1* | 7/2017 | Dichek | ................. | B64D 43/02 |
| 2017/0370960 A1 | 12/2017 | Benning et al. | | |

OTHER PUBLICATIONS

The extended European search report issued in corresponding EP application No. 19187284.5, dated Dec. 13, 2019.

* cited by examiner

AIR TEMPERATURE CORRECTION

BACKGROUND

1. Field

The present disclosure relates to aircraft data systems, more specifically to air temperature correction for example.

2. Description of Related Art

Air temperature measurements (AT), e.g., total air temperature (TAT) measurements, are currently not corrected for all environmental effects, resulting in reduced accuracy of both AT and its dependent parameters (e.g., True Airspeed, and Static Air Temperature). These reduced accuracies force aircraft to operate with sub-optimal engine settings (reduced takeoff margin and increased fuel burn in cruise) and with decreased margin on their range calculations (reduced aircraft range to provide calculation margin).

Such conventional methods and systems have generally been considered satisfactory for their intended purpose. However, there is still a need in the art for improved AT accuracy. The present disclosure provides a solution for this need.

SUMMARY

A system for correcting an air temperature (AT) reading, e.g., a total air temperature (TAT) reading, can include a water content sensor configured to measure a water content in an airflow and to output a water content signal indicative thereof, an AT sensor configured to measure an air temperature and output an AT signal indicative thereof, and a correction module operatively connected to the water content sensor and the AT sensor. The correction module can be configured to receive the water content signal and the AT signal and to correct the AT signal based on the water content to output a corrected AT signal.

The correction module can be configured to use known correlation data to correct the AT signal based on the water content. The correction module can be configured to output the corrected AT signal to one or more aircraft systems.

The correction module can be included in an air data probe operatively connected to an air data computer to output the corrected AT signal to the air data computer to correct an airspeed value using the corrected AT. In certain embodiments, the correction module can be further configured to receive at least one of an altitude value, a dynamic pressure value, a total pressure value, or a static pressure value (e.g., from any suitable aircraft system(s), e.g., an air data probe) to correct the AT. In certain embodiments, the correction module can be included in an air data air data computer operatively connected to an air data probe. The air data probe can be configured to locally correct an airspeed value using the corrected AT. In certain embodiments, the air data probe can be configured to locally correct the AT signal based on at least one of an altitude value, a dynamic pressure value, a total pressure value, or a static pressure.

The correction module can be included in an air data computer. The air data computer can also be operatively connected to at least one pitot probe, at least one static port, and at least one angle of attack indicator.

The water content sensor can be a liquid water content sensor configured to sense at least liquid water content. In certain embodiments, the water content sensor may be configured to sense ice water content. In certain embodiments, the correction module can be configured to correct the AT signal based on one or more other characterization factors (e.g., location of sensors).

In certain embodiments, the water content sensor can be configured to indirectly or directly sense a second AT. The system can include a comparison module configured to receive the second AT and the AT from the AT sensor and to compare the second AT to the AT from the AT sensor to determine if there is a fault in the AT sensor.

In certain embodiments, the AT sensor can be a first AT sensor and the AT signal is a first AT signal, and the system can include at least a second AT sensor to output a second AT signal. The system can include a comparison module configured to receive the second AT and the first AT to compare the second AT to the first AT from the AT sensor and/or to select the first AT sensor or the second AT sensor as an AT source based on the water content.

The correction module can be configured to use the water content sensor to determine a reversionary AT if the AT sensor is determined to have faulted. The correction module can be configured to ignore the water content signal to if the water content sensor is determined to have failed. In certain embodiments, the correction module can be configured to output a notification of reduced AT accuracy to alert a crew member that the AT used by one or more aircraft systems is uncorrected for water content.

In certain embodiments, the system can include a heater controller operatively connected to the correction module configured to control at least one heater system based on liquid water content (LWC), ice water content (IWC), or corrected AT (and/or any other suitable parameters, e.g., airspeed, altitude, etc.). The heater system can be at least one of a pitot tube heater or an AT sensor heater, for example. In certain embodiments, if the IWC is greater than zero, and if LWC is greater than an LWC threshold, and the AT is less than an AT threshold, the heater controller causes the at least one heater system to operate at maximum heat.

A method can include receiving a water content signal from a water content sensor that is configured to measure a water content in an airflow, receiving an air temperature (AT) signal from an AT sensor that is configured to measure an air temperature, correcting the AT based on the water content, outputting a corrected AT signal to be used by one or more aircraft systems. Correcting the AT can include using correlation data stored in the non-transitory computer readable medium to correct the AT signal based on the water content. Outputting a corrected AT signal can include outputting the AT signal to an air data computer.

A non-transitory computer readable medium having computer executable instructions configured to cause a computer to perform any method and or any portion(s) thereof disclosed herein.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
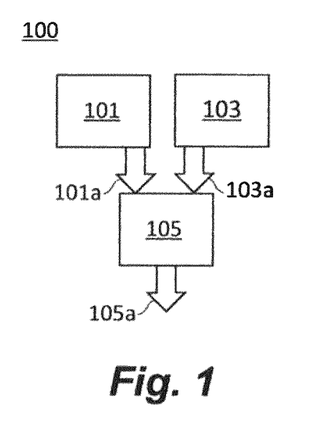
FIG. 1 is a schematic diagram of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2A-6. The systems and methods described herein can be used to provide more accurate air temperature values and enhance dependent system accuracy and overall aircraft efficiency, for example.

Referring to FIG. 1, a system 100 for correcting an air temperature (AT) reading can include a water content sensor 101 configured to measure a water content in an airflow and to output a water content signal 101a indicative thereof. The AT reading can be any suitable air temperature reading, e.g., a total air temperature (TAT) reading and/or an outer air temperature (OAT) reading. The water content sensor 101 can include one or more of an optical sensor (e.g., LIDAR, an interferometric device), multi-wire technology (e.g., an icing conditions detector), or a magnetostrictive device. The water content sensor 101 can be a liquid water content sensor configured to sense at least liquid water content. In certain embodiments, the water content sensor 101 may be configured to sense ice water content (e.g., in addition to or independent of water content). Any other suitable sensor is contemplated herein. As used herein, a sensor that senses "water content" may sense an amount (a percentage) of water (e.g., ice and/or liquid) in air or the presence of water content (e.g., ice and/or liquid) in the air, or both.

The system 100 can include an AT sensor 103 configured to measure an air temperature and output an AT signal 103a indicative thereof. The AT sensor 103 can be an air data smart probe (ADSP) for example, or any other suitable air data sensor. Any suitable AT sensor 103 (e.g., analog or digital) is contemplated herein.

The system 100 can include a correction module 105 operatively connected to the water content sensor 101 and the AT sensor 103. The correction module 105 can be configured to receive the water content signal 101a and the AT signal 103a and to correct the AT signal based on the water content to output a corrected AT signal 105a.

The correction module 105 can be configured to use known correlation data (e.g., to correct the AT signal based on the water content). The correction module 105 can be configured to output the corrected AT signal 105a to one or more aircraft systems (e.g., an air data computer or directly to avionics).

In certain embodiments, the correction module 105 can be configured to also correct the AT signal based on one or more other factors (e.g., one or more calibration factors and/or characterization factors). In certain embodiments, the one or more calibration factors can include one or more of altitude, vertical speed, density, input voltage and/or current draw (e.g., of a heater to a pitot probe), roll and/or yaw and/or pitch rates, or anything else that can have an influence on the local mass flow through the sensor/probe and/or the resulting heat transfer. In certain embodiments, the correction module 105 can be further configured to receive at least one of an altitude value, a dynamic pressure value, a total pressure value, or a static pressure value (e.g., from any suitable aircraft system(s), e.g., an air data probe) to correct the AT. In certain embodiments, the one or more characterization factor can include, e.g., a location of the sensor/probe.

Figure 2A:
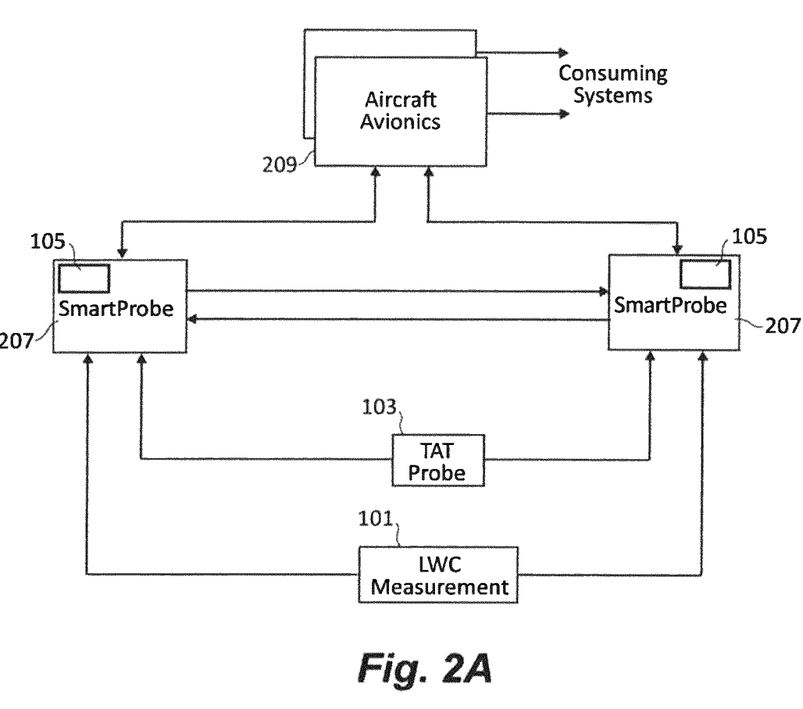
FIG. 2A is a schematic diagram of an embodiment of a system in accordance with this disclosure.

Referring additionally to FIG. 2A, in certain embodiments, the correction module 105 can be included in the air data probe operatively connected to an air data computer to output the corrected AT signal to the air data computer to correct an airspeed value using the corrected AT. In such an embodiment, the air data probe can be configured to locally correct an airspeed value using the AT signal 105a (e.g., using any suitable onboard computer hardware and/or software module(s)), e.g., to avionics 209.

In certain embodiments, the correction module 105 can be included in an air data probe 207. The air data probe 207 can be operatively connected to an air data computer (e.g., instead of avionics 209) and can output the corrected AT signal 105a from the air data probe 207 to the air data computer to correct an airspeed value using the AT signal 105a. In certain embodiments, the air data probe 207 can be configured to locally correct the AT signal based on at least one of an altitude value, a dynamic pressure value, a total pressure value, or a static pressure. As appreciated by those having ordinary skill in the art, the correction module 105 can be included in and can be capable of being operated on any suitable computerized system on an aircraft capable of receiving the AT and water content measurements, for example.

Figure 2B:
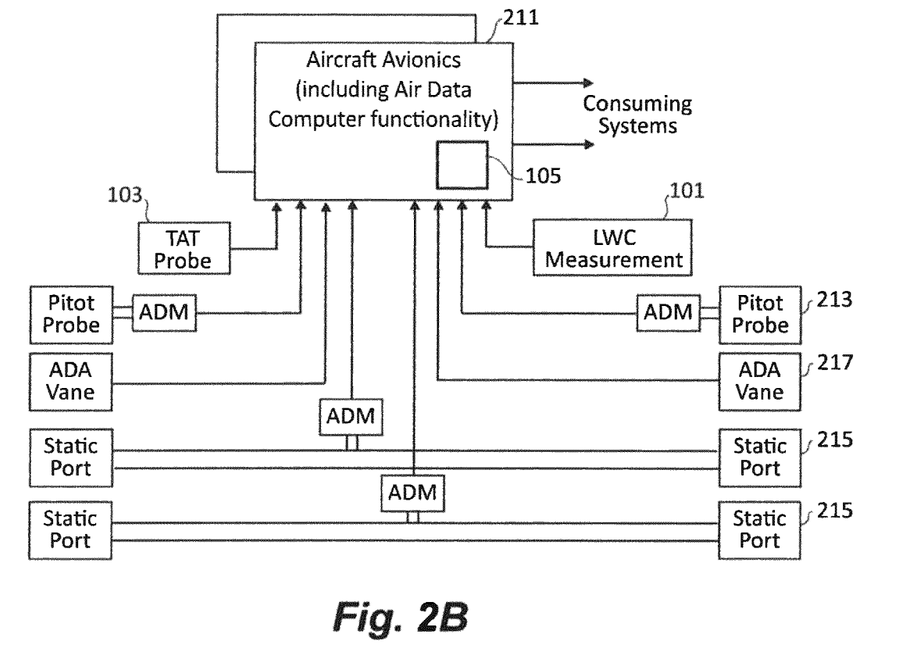
FIG. 2B is a schematic diagram of an embodiment of a system in accordance with this disclosure.
Figure 3:
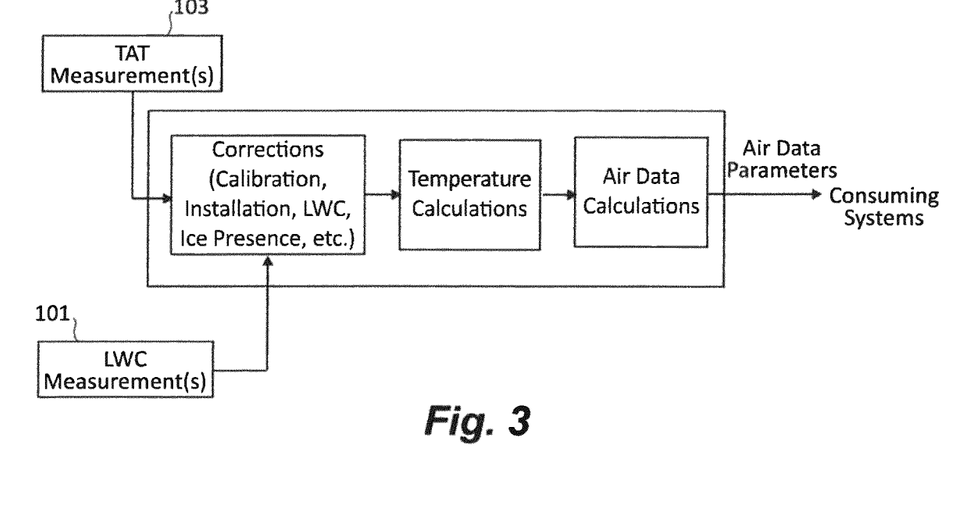
FIG. 3 is a schematic diagram of a data flow in accordance with this disclosure.

Referring to FIG. 2B, the correction module 105 can be included in an air data computer 211. The air data computer 211 can also be operatively connected to at least one pitot probe 213, at least one static port 215, and at least one angle of attack indicator 217, for example (e.g., via one or more air data management (ADM) devices as shown). FIG. 3 shows an embodiment of data flow architecture in accordance with this disclosure.

Figure 4A:
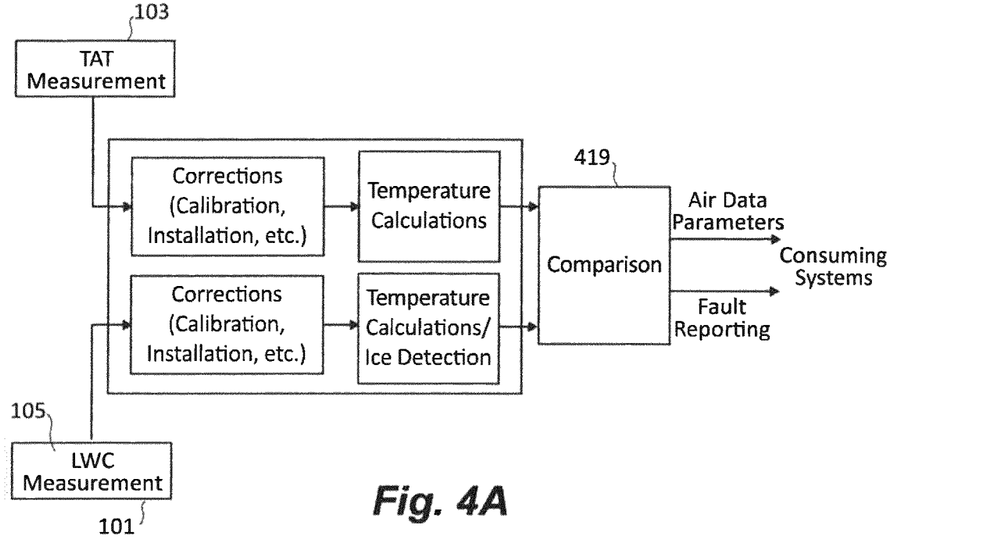
FIG. 4A is a schematic diagram of an embodiment of a monitoring system in accordance with this disclosure.
Figure 4B:
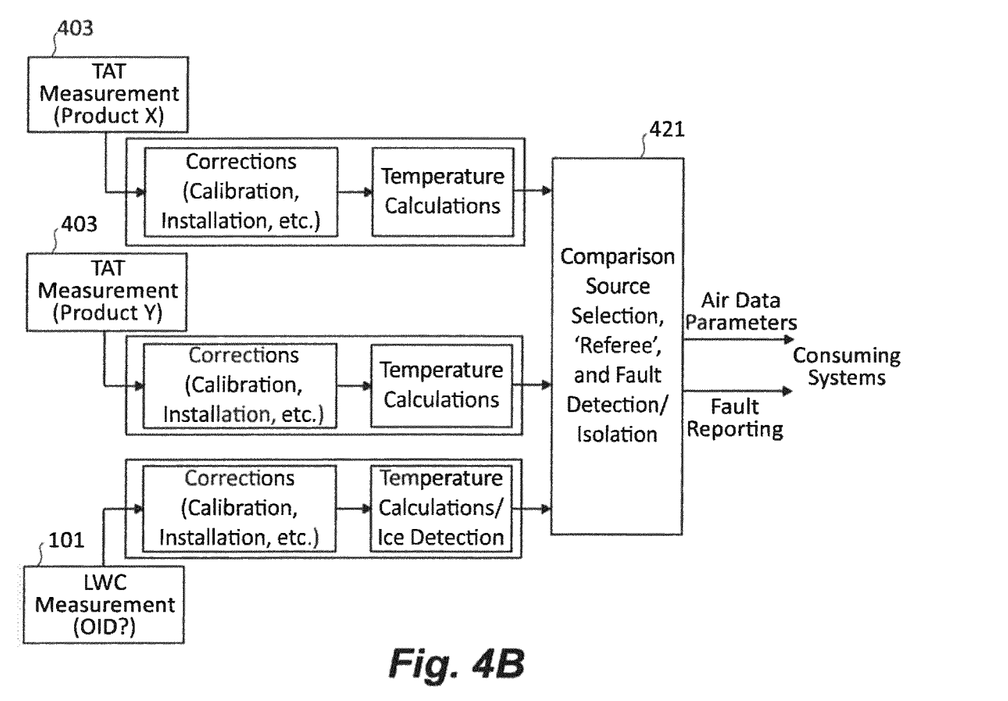
FIG. 4B is a schematic diagram of an embodiment of a monitoring system in accordance with this disclosure.

Referring additionally to FIGS. 4A and 4B, in certain embodiments, the water content sensor 101 can be configured to indirectly or directly sense a second AT (certain LWC/IWC technologies have the capability to sense/infer temperature as appreciated by those having ordinary skill in the art). The system can include a comparison module 419 configured to receive the second AT (e.g., corrected or not) and the AT from the AT sensor 103 and to compare the second AT to the AT (e.g., corrected or not) from the AT sensor 103 to determine if there is a fault in the AT sensor 103 (e.g., if the AT sensor 103 is outside correlation parameters with data from the water content sensor 101) as shown in FIG. 4A.

Embodiments of a scheme as shown in FIG. 4A is capitalizing on the LWC measurement being able to support an independent temperature calculation, making for a straightforward comparison. If the particular LWC/IWC technology in an aircraft implementation cannot measure/infer/calculate temperature for a direct comparison, FIG. 4A will still work if LWC/IWC related logic flags when sensed water/ice conditions exceed the TAT's characterization and/or qualification levels to alert the flight crew and systems that consume TAT, for example.

In certain embodiments, the AT sensor 103 can be a first AT sensor 403a and the AT signal is a first AT signal, and the system can include at least a second AT sensor 403b to output a second AT signal. The first AT sensor 403a and the second AT sensor 403b can be the same or different types of AT sensors. The system can include a comparison module 421 configured to receive the second AT and the first AT to compare the second AT (e.g., corrected or not) to the first AT (e.g., corrected or not) from the first AT sensor 403a and/or to select the first AT sensor 403a or the second AT sensor 403b as an AT source, e.g., based on the water content or any other suitable parameter.

In embodiments, if the LWC measurement can support an independent temperature calculation, then it can become the third source in a voting scheme that could break the confusion of a disagree between two TAT measurements. Alternatively, if the two TAT measurements are different products with known, different sensitivities to LWC and/or IWC, then the LWC/IWC measurement can allow the system to prioritize one TAT measurement over the other for increased TAT (and TAT-dependent parameter) accuracy.

Figure 5:
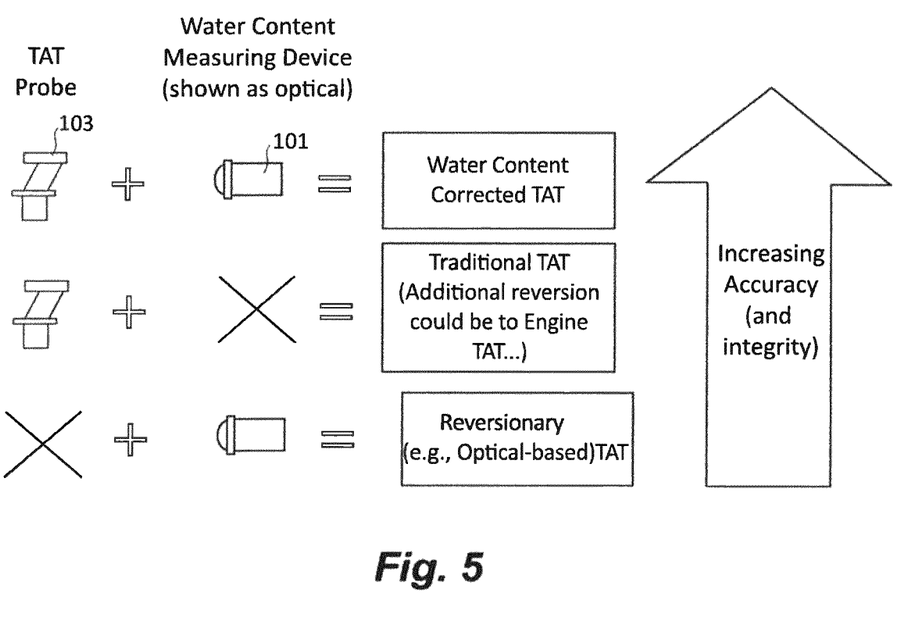
FIG. 5 is a schematic diagram of an embodiment of a reversionary scheme in accordance with this disclosure.

Referring additionally to FIG. 5, the correction module 105 can be configured to use the water content sensor 101 to determine a reversionary AT if the AT sensor 103 is determined to have faulted. Also as shown, the correction module 105 can be configured to ignore the water content signal to if the water content sensor 101 is determined to have failed. In certain embodiments, the correction module 105 can be configured to output a notification of reduced AT accuracy to alert a pilot that the AT used by one or more aircraft systems is uncorrected for water content.

Figure 6:
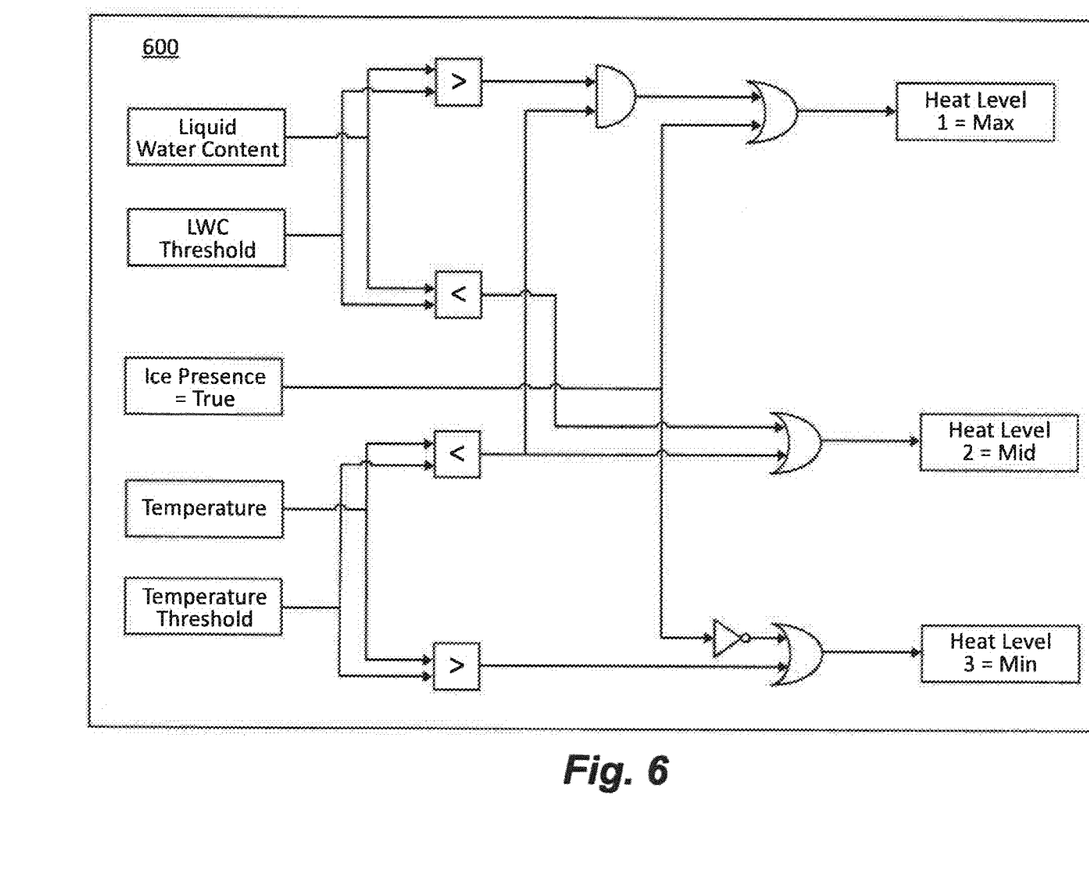
FIG. 6 is a schematic diagram of an embodiment of control logic of a heater controller in accordance with this disclosure.

Referring to FIG. 6, in certain embodiments, the system can include a heater controller 600 operatively connected to the correction module 105 and configured to control at least one heater system based on liquid water content (LWC), ice water content (IWC), or corrected AT. The heater system 600 can be at least one of a pitot tube heater or an AT sensor heater, for example, as appreciated by those having ordinary skill in the art in view of this disclosure. Any other suitable heater system (e.g., AOA sensor heaters, ice detector sensor heaters, aircraft structure heaters) is contemplated herein.

Shown is an embodiment of control logic implemented by the controller 600. For example, in certain embodiments, if the IWC is greater than zero, and if LWC is greater than an LWC threshold, and the AT is less than an AT threshold, the heater controller 600 can cause the at least one heater system to operate at maximum heat. Medium heat logic and low heat logic are also shown as appreciated by those having ordinary skill in the art in view of the disclosure. Any other suitable control scheme is contemplated herein. While step function changes are shown, it is contemplated that the changes in heating can be continuous in nature as a function of any suitable factors. For example, instead of high, medium, and low settings, it is contemplated that the heater controller 600 can cause the at least one heater system to operate at a heat setting correlated to the value of one or more of the disclosed variables (e.g., IWC, LWC, AT).

Certain control logic embodiments (e.g., as shown) can be configured to benefit from hysteresis on the thresholds and thus the ability to account for uncertainty in the LWC/IWC measurements. Controlling heater function can enhance the life of the heating system and related systems and reduce power consumption by the aircraft overall, for example.

In accordance with at least one aspect of this disclosure, a method can include receiving a water content signal from a water content sensor that is configured to measure a water content in an airflow, receiving an air temperature (AT) signal from an AT sensor that is configured to measure an air temperature, correcting the AT based on the water content, outputting a corrected AT signal to be used by one or more aircraft systems. Correcting the AT can include using correlation data stored in the non-transitory computer readable medium to correct the AT signal based on the water content. Outputting a corrected AT signal can include outputting the AT signal to an air data computer.

A non-transitory computer readable medium having computer executable instructions configured to cause a computer to perform any method and or any portion(s) thereof disclosed herein.

Embodiments can include an aircraft system architecture that includes at least one air temperature measurement, e.g., TAT measurement and at least one independent and dissimilar (e.g., derived from a different physical system) Liquid Water Content (LWC) measurement which supports one or more channels of air data parameter calculations. The air data channels can be integrated or distributed air data systems, for example. Embodiments include a function to correct the raw AT measurement using the LWC measurement (e.g., in addition to the traditional AT corrections such as heating errors and AOA). The correction can be based upon a complete characterization via analysis/wind tunnel/flight test, or it could be a simple offset based upon a pre-determined threshold of water content or presence of ice in the air mass.

Embodiments can include a function to provide monitoring/voting of the independent temperature measurements, including a 'referee' function to prioritize among dissimilar temperature measurements. Embodiments can include a function to provide reversionary logic among the temperature measurement/calculation sources for increased availability and integrity.

Embodiments can include a function to regulate probe heating levels (Pitot, TAT, AOA, etc.) notionally based upon the presence of water or ice in the air and the air temperature. Such a function can be expanded to include other relevant inputs such as altitude, airspeed, AOA, and others.

Embodiments increased AT accuracy, e.g., in rain and icing conditions. TAT can be used in static air temperature (SAT) calculations and temperature corrections can have a significant impact on engine efficiency/performance. Embodiments provide increased capability to set optimal engine settings using more accurate temperature measurements improves thrust margin at takeoff and decreases fuel burn in cruise. AT (e.g., TAT and/or OAT) is also used in the calculation of true airspeed (TAS), so improvements in temperature measurement can also result in better navigation and route planning (in addition to all other systems that rely on true airspeed) due to less range being wasted on margin for temperature input uncertainties.

Assuming the water content measurement system can measure/calculate AT via different technology (e.g., optical), there is additional benefit to AT availability including aircraft fault detection/isolation functions, and protection from common mode failures. For example, as described above, one specific implementation of this could be referred to as a 'referee' function such that if liquid water content is above some threshold based upon analysis or qualification levels, then the air data probe or air data computer can presume the AT measurement is compromised and ignore AT, or revert to another other AT source (e.g., like engine AT), or flag the AT-dependent air data parameters as degraded to alert the flight crew.

Another approach can be to use this kind of 'referee' to choose between two different AT probes with different rain/icing performance used in the same architecture. For example, referring to FIG. 4B, if the aircraft is encountering icing, the system can prioritize/trust Product X technology AT probe, or if the aircraft is encountering liquid water, the system can prioritize/trust Product Y technology AT probe.

Additionally, the ability to tailor the heat levels based upon critical ambient conditions could allow for reduced power AT power consumption (and thus aircraft power generation). The time spent at lower heat levels would significantly extend the MTBF of AT and other heated probes. Embodiments can function and provide benefits across different icing conditions (e.g., ice crystal formation), including those beyond the current certification regulations and qualification levels.

Figure 7A:
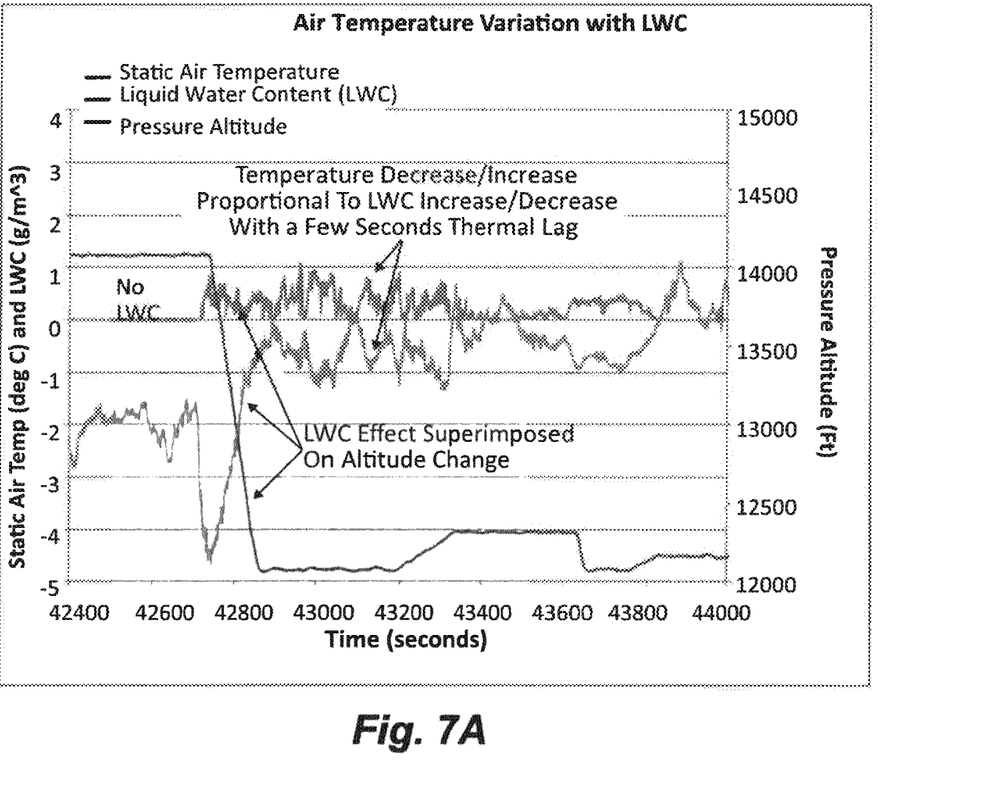
FIGS. 7A and 7B are charts that show example correlation data from test flights.
Figure 7B:
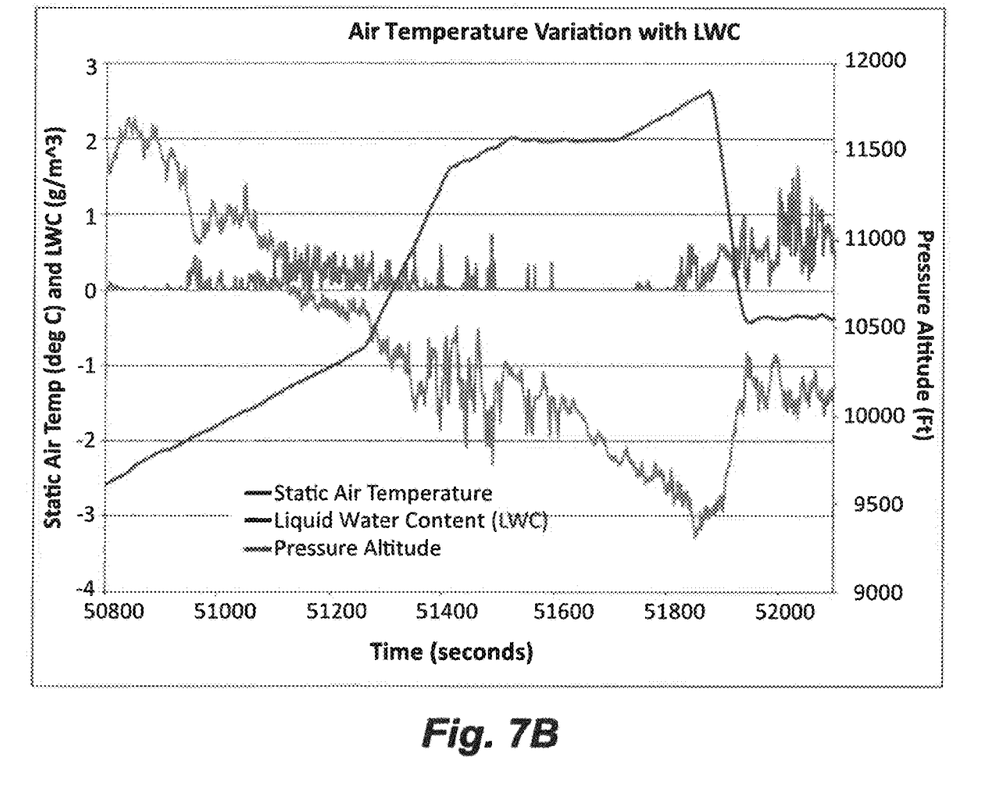

Referring to FIGS. 7A and 7B, example correlation data is shown. It can be seen that presence of LWC causes a change in the, e.g., TAT (and thus static air temperature (SAT)) measurement. While SAT is shown rather than TAT for graphical purposes, variations for TAT and water content are the same. In FIGS. 7A and 7B, there is a very distinct variation in the SAT that mirrors the LWC showing that the SAT/TAT decreases proportional to an LWC increase. This effect makes sense as there will be more cooling of the TAT probe strut as the LWC increases. Thus, the de-icing heater error (DHE) effect decreases as the LWC increases. The LWC effect is most noticeable when the altitude (and therefore ambient temperature) are roughly constant. When the aircraft is changing altitudes (and temperatures), the LWC effect is superimposed on top of the altitude effect. While the altitude is changing more dramatically over the time period shown in FIG. 7B, the LWC effect can still be seen. The spikes in LWC (even small ones) correlate very well to sudden temperature decreases measured by the TAT probe. It is contemplated that correcting for ice water content may also improve the correlation of the LWC effect on TAT/SAT. It is also contemplated that robust data can be developed by one having ordinary skill in the art without undue experimentation (e.g., using any suitable model or empirical tests).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on an aircraft computer (e.g., an air data computer of an aircraft), partly on the aircraft computer, as a stand-alone software package, partly on the aircraft computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

It must be noted that as used herein and in the appended claims, the singular forms "a", "an," and "the" include the plural of the terms applied thereto. Thus, for example, reference to "a sensor" includes a plurality of such sensors and reference to "the signal" includes reference to one or more signals and equivalents thereof known to those skilled in the art, and so forth.

Any suitable combination(s) of any disclosed embodiments and/or any suitable portion(s) thereof are contemplated herein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system for correcting an air temperature (AT) reading, comprising:
    a water content sensor configured to measure a water content in an airflow and to output a water content signal indicative thereof;
    an AT sensor configured to measure an air temperature and output an AT signal indicative thereof; and
    an air data probe, including:
        a correction module operatively connected to the water content sensor and the AT sensor, wherein the correction module is configured to receive the water content signal and the AT signal and to correct the AT signal based on the water content to output a corrected AT signal, wherein the correction module is configured to locally correct the AT signal based on at least one of an altitude value, a dynamic pressure value, a total pressure value, and/or a static pressure and output the corrected AT signal to one or more aircraft systems.

2. The system of claim 1, wherein the correction module is configured to use known correlation data to correct the AT signal based on the water content.

3. The system of claim 1, wherein the air data probe operatively connected to an air data computer to output the corrected AT signal to the air data computer to correct an airspeed value using the AT signal.

4. The system of claim 1, wherein the air data probe operatively connected to an air data computer, wherein the air data probe is configured to locally correct an airspeed value using the AT signal.

5. The system of claim 1, wherein the correction module is operatively connected to an air data computer.

6. The system of claim 5, wherein the air data computer is also operatively connected to at least one pitot probe, at least one static port, and at least one angle of attack indicator.

7. The system of claim 1, wherein the water content sensor is a liquid water content sensor configured to sense at least liquid water content.

8. The system of claim 1, wherein the correction module is configured to correct the AT signal based on one or more other factors.

9. The system of claim 1, wherein the water content sensor is configured to indirectly or directly sense a second AT, wherein the system includes a comparison module configured to receive the second AT and the AT from the AT sensor and to compare the second AT to the AT from the AT sensor to determine if there is a fault in the AT sensor.

10. The system of claim 1, wherein the AT sensor is a first AT sensor and the AT signal is a first AT signal, the system further comprising at least a second AT sensor to output a second AT signal, wherein the system includes a comparison module configured to receive the second AT and the first AT to compare the second AT to the first AT from the AT sensor and/or to select the first AT sensor or the second AT sensor as an AT source based on the water content.

11. The system of claim 1, wherein the correction module is configured to use the water content sensor to determine a reversionary AT if the AT sensor is determined to have faulted.

12. The system of claim 11, wherein the correction module is configured to ignore the water content signal to if the water content sensor is determined to have failed, and wherein the correction module is configured to output a notification of reduced AT accuracy to alert a pilot that the AT used by one or more aircraft systems is uncorrected for water content.

13. The system of claim 1, further comprising a heater controller operatively connected to the correction module configured to control at least one heater system based on at least one of liquid water content (LWC), ice water content (IWC), or corrected AT.

14. The system of claim 13, wherein the heater system is at least one of a pitot tube heater, an AT sensor heater, an AOA sensor heater, an ice detector sensor heater, or an aircraft structure heater.

15. The system of claim 13, wherein if the IWC is greater than zero, and if LWC is greater than an LWC threshold, and the AT is less than an AT threshold, the heater controller causes the at least one heater system to operate at maximum heat.

16. An air data probe comprising, a non-transitory computer readable medium having computer executable instructions configured to cause a computer to perform a method, the method, comprising:

receiving a water content signal from a water content sensor that is configured to measure a water content in an airflow;

receiving an air temperature (AT) signal from an AT sensor that is configured to measure an air temperature;

locally correcting the AT using a correction module in the air data probe based on the water content, and at least one of an altitude value, a dynamic pressure value, a total pressure value, and/or a static pressure; and outputting a corrected AT signal to be used by one or more aircraft systems.

17. The method of claim 16, wherein correcting the AT includes using correlation data stored in the non-transitory computer readable medium to correct the AT signal based on the water content.

18. The method of claim 16, wherein outputting a corrected AT signal includes outputting the AT signal to an air data computer.

\* \* \* \* \*